(12) United States Patent
Shao et al.

(10) Patent No.: US 8,509,159 B2
(45) Date of Patent: Aug. 13, 2013

(54) METHOD AND SYSTEM FOR WIRELESS COMMUNICATION USING OUT-OF-BAND CHANNELS

(75) Inventors: Huai-Rong Shao, Santa Clara, CA (US);
Harkirat Singh, Santa Clara, CA (US);
Xiangping Qin, San Jose, CA (US);
Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 862 days.

(21) Appl. No.: 12/014,663

(22) Filed: Jan. 15, 2008

(65) Prior Publication Data
US 2008/0175197 A1    Jul. 24, 2008

Related U.S. Application Data

(60) Provisional application No. 60/881,441, filed on Jan. 19, 2007.

(51) Int. Cl.
*H04B 7/212* (2006.01)

(52) U.S. Cl.
USPC ............................ 370/329; 370/343; 370/480

(58) Field of Classification Search
USPC ........................................ 370/329, 343, 480
See application file for complete search history.

(56) References Cited

U.S. PATENT DOCUMENTS

| | | | |
|---|---|---|---|
| 5,613,200 A | 3/1997 | Hamabe | |
| 5,819,182 A | 10/1998 | Gardner et al. | |
| 5,963,852 A | 10/1999 | Schlang et al. | |
| 6,330,459 B1 | 12/2001 | Crichton et al. | |
| 6,526,036 B1 * | 2/2003 | Uchida et al. | 370/342 |
| 6,853,629 B2 | 2/2005 | Alamouti et al. | |
| 6,980,839 B2 | 12/2005 | DaCosta | |
| 7,027,409 B2 | 4/2006 | Cain | |
| 7,079,509 B2 | 7/2006 | Belcea | |
| 7,085,572 B2 | 8/2006 | Ishida | |
| 7,099,689 B2 | 8/2006 | Bahl et al. | |
| 7,103,344 B2 | 9/2006 | Menard | |
| 7,103,383 B2 | 9/2006 | Ito | |
| 7,120,392 B2 | 10/2006 | Chu et al. | |
| 7,155,264 B2 | 12/2006 | Twitchell | |
| 7,209,771 B2 | 4/2007 | Twitchell | |

(Continued)

FOREIGN PATENT DOCUMENTS

| | | |
|---|---|---|
| KR | 10-2002-0038823 A | 5/2002 |
| KR | 1020020038823 A | 5/2002 |
| KR | 1020040069516 A | 8/2004 |
| WO | 02067459 A1 | 8/2002 |

OTHER PUBLICATIONS

Hitachi Licensinc, LLC, High-Definition Multimedia Interface (HDMI) Specifications version 1.2, Aug. 22, 2005, 214 pp., US.

(Continued)

*Primary Examiner* — Jay P Patel
(74) *Attorney, Agent, or Firm* — Kenneth L. Sherman, Esq.; Michael Zarrabian, Esq.; Sherman & Zarrabian LLP

(57) ABSTRACT

A method and system for ad-hoc wireless communication using out-of-band control channels is provided. An out-of-band control channel is scanned to discover a wireless station. Channel occupation information is communicated with the discovered station. A communication channel is selected based on the occupation information, and may be used for ad-hoc mode information communication with the discovered station.

56 Claims, 5 Drawing Sheets

(56) References Cited

U.S. PATENT DOCUMENTS

| | | | |
|---|---|---|---|
| 7,227,851 B1 * | 6/2007 | Gopalakrishnan et al. | 370/335 |
| 7,272,134 B2 * | 9/2007 | Iwama et al. | 370/352 |
| 7,280,834 B2 | 10/2007 | Takarabe | |
| 7,327,981 B2 * | 2/2008 | Hundal | 455/41.2 |
| 7,359,733 B2 | 4/2008 | Liang et al. | |
| 7,519,399 B2 * | 4/2009 | Suzuki | 455/569.1 |
| 7,565,158 B1 * | 7/2009 | Aholainen | 455/458 |
| 7,596,367 B2 | 9/2009 | Kawasaki | |
| 7,630,339 B2 | 12/2009 | Laroia et al. | |
| 7,653,163 B2 * | 1/2010 | Sadri et al. | 375/349 |
| 7,724,656 B2 * | 5/2010 | Sàgfors et al. | 370/229 |
| 7,742,788 B2 | 6/2010 | Frank | |
| 7,747,218 B2 * | 6/2010 | Sasai et al. | 455/41.2 |
| 7,792,066 B2 | 9/2010 | Fujii et al. | |
| 7,822,440 B2 | 10/2010 | Park et al. | |
| 7,826,471 B2 | 11/2010 | Wilson et al. | |
| 7,843,819 B1 | 11/2010 | Benveniste | |
| 7,865,183 B2 | 1/2011 | Salokannel et al. | |
| 7,949,358 B2 | 5/2011 | Wentink et al. | |
| 7,957,777 B1 | 6/2011 | Vu et al. | |
| 8,027,282 B2 | 9/2011 | Boehnke et al. | |
| 2003/0078062 A1 | 4/2003 | Burr | |
| 2003/0099249 A1 * | 5/2003 | Heijenk | 370/412 |
| 2004/0002357 A1 | 1/2004 | Benveniste | |
| 2004/0063458 A1 | 4/2004 | Hori et al. | |
| 2004/0064309 A1 * | 4/2004 | Kosai | 704/211 |
| 2004/0247023 A1 * | 12/2004 | Sasai et al. | 375/220 |
| 2005/0083873 A1 | 4/2005 | Yamamoto | |
| 2005/0177639 A1 * | 8/2005 | Reunamaki et al. | 709/227 |
| 2006/0040714 A1 * | 2/2006 | Suzuki | 455/569.1 |
| 2006/0045035 A1 | 3/2006 | Liu | |
| 2006/0067283 A1 | 3/2006 | So et al. | |
| 2006/0073847 A1 | 4/2006 | Pirzada et al. | |
| 2006/0194564 A1 | 8/2006 | Hokimoto et al. | |
| 2006/0198353 A1 | 9/2006 | Wason et al. | |
| 2006/0209772 A1 | 9/2006 | Fang et al. | |
| 2006/0217062 A1 | 9/2006 | Saffre et al. | |
| 2006/0251256 A1 | 11/2006 | Asokan et al. | |
| 2006/0268802 A1 | 11/2006 | Faccin | |
| 2007/0253391 A1 | 11/2007 | Shao et al. | |
| 2007/0268972 A1 | 11/2007 | Kim | |
| 2007/0286136 A1 | 12/2007 | Rittle et al. | |
| 2007/0287500 A1 * | 12/2007 | Riley | 455/562.1 |
| 2008/0002652 A1 * | 1/2008 | Gupta et al. | 370/338 |
| 2008/0005219 A1 | 1/2008 | Nabar et al. | |
| 2008/0031208 A1 | 2/2008 | Abhishek et al. | |
| 2008/0039046 A1 * | 2/2008 | Vilzmann et al. | 455/296 |
| 2008/0056390 A1 * | 3/2008 | Rainbolt et al. | 375/260 |
| 2008/0059599 A1 * | 3/2008 | Chokshi et al. | 709/212 |
| 2008/0119209 A1 * | 5/2008 | Upp | 455/458 |
| 2008/0130617 A1 | 6/2008 | Singh et al. | |
| 2008/0140650 A1 * | 6/2008 | Stackpole | 707/5 |
| 2008/0175198 A1 | 7/2008 | Singh et al. | |
| 2008/0175199 A1 | 7/2008 | Shao et al. | |
| 2008/0176521 A1 | 7/2008 | Singh et al. | |
| 2008/0176561 A1 | 7/2008 | Shao et al. | |
| 2008/0177886 A1 | 7/2008 | Singh et al. | |
| 2009/0185489 A1 * | 7/2009 | Ruffini et al. | 370/237 |
| 2010/0111006 A1 | 5/2010 | Zhai et al. | |
| 2011/0002243 A1 | 1/2011 | Sherman et al. | |

OTHER PUBLICATIONS

IEEE Computer Society, IEEE Std 802.15.3, "Wireless Medium Access Control (MAC) and Physical Layer (PHY) Specifications for High Rate Wireless Personal Area Networks (WPANs)," 2003, 324 pp., The Institute of Electrical and Electronics Engineers, US.

ECMA International, Standard ECMA-368 High Rate Ultra Wideband PHY and MAC Standard, 1st Edition, 326 pp., Dec. 2005, CH.

WirelessHD, LLC, WirelessHD specification, revision 0.2, "WirelessHD Wireless Video Area Network (WVAN) specification," Jul. 12, 2006, pp. 1-229, US.

Notification of Transmittal of the International Search Authority, Written Opinion for International Application No. PCT/KR2008/000316 dated Apr. 29, 2008, 11 pages.

Notification of Transmittal of the International Search Authority, Written Opinion for International Application No. PCT/KR2008/000323 dated May 6, 2008, 10 pages.

Notification of Transmittal of the International Search Authority, Written Opinion for International Application No. PCT/KR2008/000318 dated May 6, 2008, 9 pages.

Multiband OFDM Alliance (MBOA) Special Interest Group et al., "Distributed Medium Access Control (MAC) for Wireless Networks, Draft 0.99," MBOA Special Interest Group and WiMedia Alliance, Inc., Nov. 1, 2005, pp. i-176, United States.

U.S. Non-Final Office Action for U.S. Appl. No. 12/014,693 mailed on Jan. 6, 2011.

U.S. Notice of Allowance for U.S. Appl. No. 12/014,693 mailed on Apr. 11, 2011.

U.S. Non-final Office Action for U.S. Appl. No. 12/014,709 mailed Dec. 21, 2010.

U.S. Non-final Office Action for U.S. Appl. No. 12/014,709 mailed Jun. 9, 2011.

U.S. Notice of Allowance for U.S. Appl. No. 12/014,693 mailed on Jul. 22, 2011.

U.S. Final Office Action for U.S. Appl. No. 12/014,683 mailed Jun. 8, 2012.

Cidon, I. et al., "Fast Connection Establishment in High Speed Networks," Proceedings of the ACM Symposium on Communication Architectures & Protocols (SIGCOMM '90), 1990, pp. 287-296, ACM, United States.

Clark, D.D. et al., "An Analysis of TCP Processing Overhead," IEEE Communications Magazine, Jun. 1989, pp. 23-29, vol. 27, No. 6, IEEE, United States.

Crutcher, L.A. et al., "Connection Management for an ATM Network, " IEEE Network, Nov. 1992, pp. 42, vol. 6, No. 6: Abstract, IEEE, United States.

International Search Report dated Apr. 28, 2008 for International Application No. PCT/KR2008/000326 filed Jan. 18, 2008, pp. 1-9, Korean Intellectual Property Office, Seo-gu, Daejeon, Republic of Korea.

Korean Final Office Action dated Nov. 20, 2009 for Korean Patent Application No. 10-2008-7008114, filed on Apr. 3, 2008, pp. 1-2, Korean Intellectual Property Office, Seo-gu, Daejeon, Republic of Korea (A machine-generated English translation attached, p. 1).

Korean Final Office Action dated Aug. 31, 2010 for Korean Patent Application No. 10-2008-7009721, filed on Apr. 23, 2008, pp. 1-2, Korean Intellectual Property Office, Seo-gu, Daejeon, Republic of Korea (A machine-generated English translation attached, p. 1).

Korean Non-Final Office Action dated Mar. 8, 2010 for Korean Patent Application No. 10-2008-7009721, filed on Apr. 23, 2008, pp. 1-5, Korean Intellectual Property Office, Seo-gu, Daejeon, Republic of Korea (A machine-generated English translation attached, pp. 1-5).

Korean Non-Final Office Action dated Sep. 17, 2009 for Korean Patent Application No. 10-2008-7008114, filed on Apr. 3, 2008, pp. 1-3, Korean Intellectual Property Office, Seo-gu, Daejeon, Republic of Korea (A machine-generated English translation attached, pp. 1-2).

Lindgren, P. et al., "Fast Connection Establishment in the DTM Gigabit Network," Proceedings of the IFIP TC6/WG6.4 Fifth International Conference on High Performance Networking V, 1994, pp. 283-294, North-Holland Publishing Company Amsterdam, The Netherlands.

Notification of Transmittal of the International Search Authority, International Search Report and Written Opinion dated Apr. 29, 2008 for International Application No. PCT/KR2008/000317 filed Jan. 18, 2008, pp. 1-10, Korean Intellectual Property Office, Seo-gu, Daejeon, Republic of Korea.

Notification of Transmittal of the International Search Authority, International Search Report and Written Opinion dated May 6, 2008 for International Application No. PCT/KR2008/000319 filed Jan. 18, 2008, pp. 1-10, Korean Intellectual Property Office, Seo-gu, Daejeon, Republic of Korea.

Shih, E. et al., "Wake on Wireless: An Event Driven Energy Saving Strategy for Battery Operated Devices," Proceedings of the 8th Annual International Conference on Mobile Computing and Networking (MobiCom '02), 2002, pp. 1-12, ACM, New York, United States.

U.S. Notice of Allowance for U.S. Appl. No. 12/014,693 mailed on Nov. 1, 2011.

U.S. Requirement for Restriction/Election for U.S. Appl. No. 12/014,683 mailed Mar. 30, 2011.

U.S. Non-Final Office Action for U.S. Appl. No. 12/014,683 mailed Jul. 20, 2011.

U.S. Non-Final Office Action for U.S. Appl. No. 12/014,683 mailed Dec. 22, 2011.

U.S. Non-final Office Action for U.S. Appl. U.S. Appl. No. 12/014,709 mailed Feb. 21, 2012.

U.S. Non-Final Office Action for U.S. Appl. No. 12/014,719 mailed Aug. 24, 2010.

U.S. Final Office Action for U.S. Appl. No. 12/014,709 mailed Sep. 17, 2012.

* cited by examiner

METHOD AND SYSTEM FOR WIRELESS COMMUNICATION USING OUT-OF-BAND CHANNELS

RELATED APPLICATION

This application claims priority from U.S. Provisional Patent Application Ser. No. 60/881,441, filed on Jan. 19, 2007, incorporated herein by reference.

FIELD OF THE INVENTION

The present invention relates to wireless communications, and in particular to channels for wireless communications.

BACKGROUND OF THE INVENTION

Many communication systems implement infrastructure mode wireless networking for communication via central connection points (access points) for wireless local area network (WLAN) clients. An access point forwards data for the wireless clients, enabling the wireless clients to communicate with each other through the access point.

In some applications of infrastructure mode wireless networking, a wireless access point that functions as a coordinator uses an in-band control channel, and stores the information of all wireless client devices associated to it. In this case a device can send an information request to the coordinator to obtain the in formation of other devices within the wireless network.

Such infrastructure mode assumes all devices can periodically receive beacons from the wireless coordinator, indicting channel occupation. However, one or more devices may be located outside the transmission coverage range of the coordinator. For example, if wireless device A wishes to discover wireless device B, but one or both of the two devices are not within reach of the wireless coordinator, then the discovery mechanism fails.

BRIEF SUMMARY OF THE INVENTION

The present invention provides a method and system for wireless communicates using an out-of-band channel. One embodiment involves using an out-of-band wireless channel to facilitate information communication on an in-band wireless channel between a pair of wireless stations.

An implementation includes the steps of scanning an out-of-band channel to discover a wireless station, and communicating channel occupation information with the discovered station. Then an in-band communication channel is selected based on the occupation information for information communication with the discovered station over the in-band channel. The information communication may include ad-hoc mode communication over the in-band wireless channel.

In one implementation, capability information is communicated with the discovered station over the out-of-band channel to establish association. Further, communicating channel occupation information includes communicating channel occupation information with the discovered station over the out-of-band channel.

These and other features, aspects and advantages of the present invention will become understood with reference to the following description, appended claims and accompanying figures.

BRIEF DESCRIPTION OF THE DRAWINGS

In the drawings, like references refer to similar elements.

DETAILED DESCRIPTION OF THE INVENTION

Figure 1:
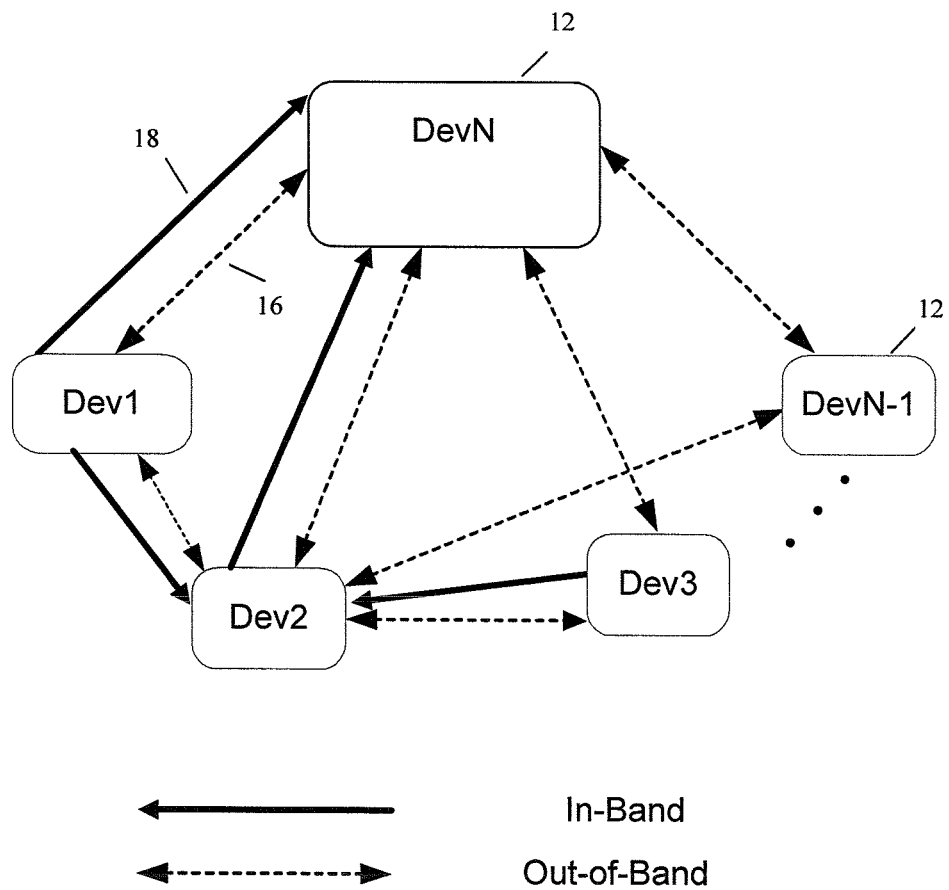
FIG. 1 shows a block diagram of a wireless network implementing wireless communication, according to an embodiment of the present invention.

The present invention provides a method and system for wireless communication using an out-of-band channel. One embodiment involves a communication process using an out-of-band wireless channel to facilitate information communication on an in-band wireless channel between a pair of wireless stations. An out-of-band channel is a first physical channel that is out-of-band relative to a second physical channel (i.e., an in-band channel). The out-of-band channel is at a frequency different from an in-band channel. For example, an in-band data transmission channel may operate on a 60 GHz frequency band, whereas, an out-of-band channel may operate on a 5 GHz or 2.4 GHz (or even another 60 GHz) frequency band. An out-of-band frequency means a different frequency than an in-band frequency, even if both are in the same frequency band.

In one implementation of the above communication process, an out-of-band channel is used for control message transmissions. This helps reduce collisions and interferences between adjacent transmissions on an in-band channel, whereby multiple streams can be simultaneously transmitted on the same in-band data channel using a directional transmission scheme. In an ad-hoc mode wireless communication process, each wireless client in a network forwards data for other wireless clients as determined based on the network connectivity, by using out-of-band channels for communicating control information messages according to the present invention.

A reservation scheme may be applied to a channel (out-of-band channel and/or in-band channel) based on a superframe structure including superframes separated by beacons. In a contention-free period (CFP), time scheduling is utilized, wherein beacons provide information about scheduled channel time blocks. Further, a bandwidth reservation scheme is applied based on the superframe structure, wherein beacons divide the channel time into multiple superframes. In each superframe there are contention periods and contention-free periods. In each CFP there are one or more schedules, wherein each schedule includes one or more reserved channel time blocks for transmission. The schedules represent reserved channel time blocks, and the time periods between the schedules are unreserved channel time blocks. The length of each reserved channel time block is defined in a schedule for a pair of stations. In one example, a beacon can include bandwidth allocation information elements (IE), indicating channel occupation information (e.g., certain duration of a channel time block is reserved for communication).

Transmission of beacons can be placed anywhere in a superframe, (e.g., mMaxBeaconIntervalTime period) providing flexibility for point-to-point ad-hoc transmissions with an out-of-band channel for control messages.

An example implementation for a 60 GHz frequency band wireless network is described below. Such implementation is useful with Wireless HD (WiHD) applications. Wireless HD is an industry-led effort to define a wireless digital network interface specification for wireless HD digital signal transmission on the 60 GHz frequency band, e.g., for consumer electronics (CE) and other electronic products. An example WiHD network utilizes a 60 GHz-band mmWave technology to support a physical (PHY) layer data transmission rate of multi-Gbps (gigabits per second), and can be used for transmitting uncompressed high definition television (HDTV) signals wirelessly. The present invention is useful with other wireless communication systems as well.

FIG. 1 shows a functional block diagram of a wireless network 10 that implements ad-hoc wireless communication between N wireless stations 12 (e.g., devices Dev1, . . . , DevN−1) on a 60 GHz frequency band using Frequency Division Duplex (FDD) channel access, according to an embodiment of the present invention. An out-of-band channel 16 is used for ad-hoc mode control message transmissions to coordinate the transmissions on the in-band data channel 18. Transmission beacons can be placed anywhere in a superframe on the out-of-band channel, providing flexibility for point-to-point 60 GHz ad-hoc transmissions with an out-of-band channel.

At higher frequency bands such as 60 GHz there is much more free space loss than at lower frequencies such as 2 GHz or 5 GHz because free space loss increases quadratically with the increase in the frequency. This higher free space loss can be compensated for using multiple antennas with more pattern directivity, while maintaining small antenna dimensions, known as beamforming. When beamforming is used, antenna obstruction (e.g., by an object) and mis-pointing, may easily cause a substantial drop in received transmission power. This may nullify the advantage of using multiple antennas. Therefore, dynamic beamsearching and beamtracking are used to maintain stable beamforming transmission. Beamtracking involves monitoring the quality of beamformed transmission on a beamforming channel, while beamsearching involves searching for new beamforming coefficients to provide satisfactory channel quality. At higher frequencies such as 60 GHz transmissions, directional antennas can be used, wherein one or more directional antennas at a sender can physically point to a receiver to compensate for higher free space loss. Usually there is no dynamic beamsearching when directional antennas are used, and simple antenna scanning or training can be used instead.

In the example network 10 shown in FIG. 1 according to the present invention, the stations 12 operate in ad-hoc transmission mode, wherein stations coordinate with each other within the transmission range of one another. An out-of-band omni-directional channel 16 is used for control message signaling purposes, and a directional in-band data channel 18 (e.g., 60 GHz) is used for data communication. In one example, the out-of-band channel 16 can use different technologies such as Bluetooth, WLAN, other wireless technologies such as UWB, or even another different 60 GHz channel (e.g., same bandwidth or narrower than channel 18). The out-of-band channel 16 has the same coverage range as the in-band data channel 18. The data channel 18 is an asymmetric channel (e.g., 60 GHz data transmission is for one-way transmission only). Further, there is a default channel for control messages all of the stations but there need not be an in-band data channel for all of the stations.

The out-of-band channel 16 is a symmetric channel and supports a half-duplex mode. The in-band channel selection (e.g., to determine which 60 GHz data channel to use) for data communication between two stations is determined between the two stations (devices) by bandwidth reservation signaling on a default out-of-band channel (e.g., sending a bandwidth reservation request message and obtaining a bandwidth reservation response indicating if the bandwidth is reserved). Multiple transmissions can share the same in-band channel simultaneously by using the directional transmission to avoid interference.

Figure 2:
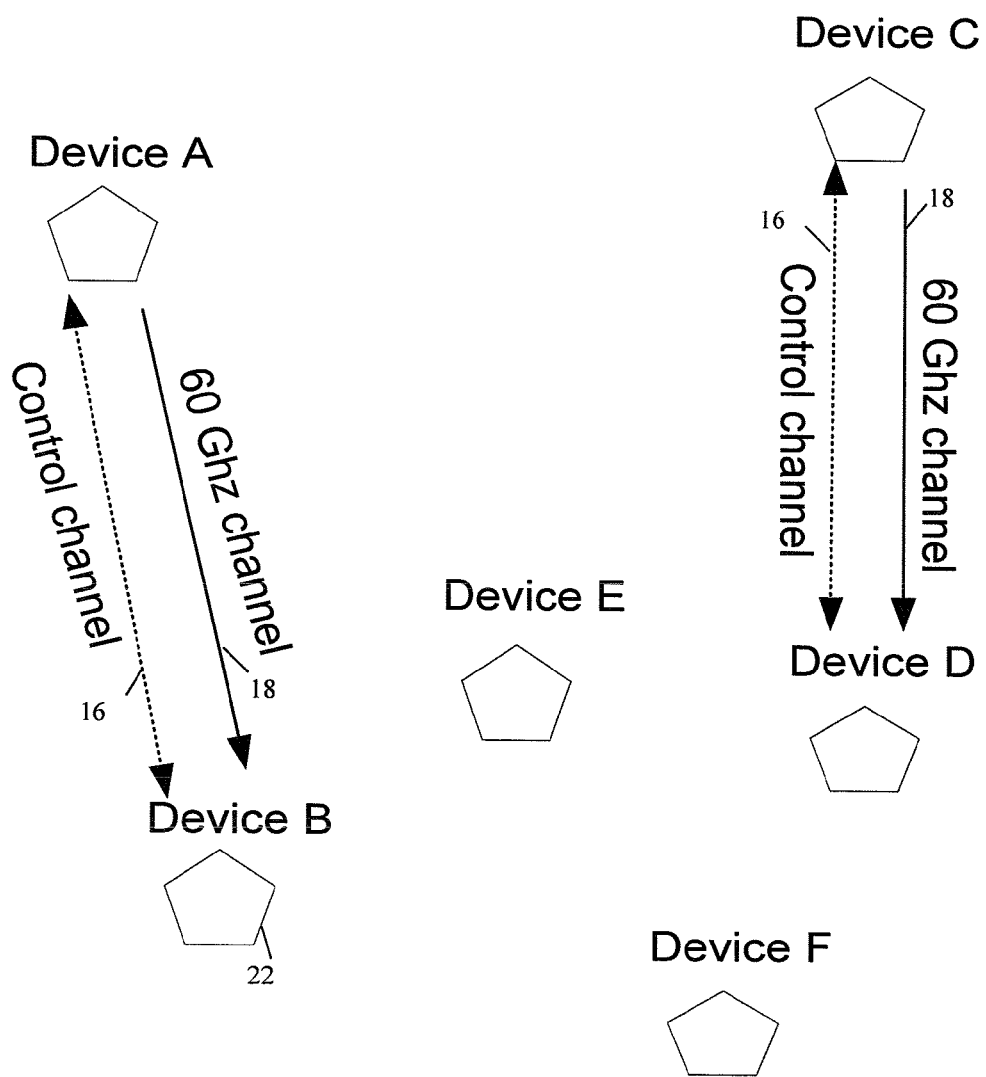
FIG. 2 shows an example configuration for ad-hoc wireless communication, according to the present invention.

FIG. 2 shows an example communication configuration in a network 20 including wireless stations 22 (e.g., Device A, Device B, Device C, Device D, Device E and Device F), according to the present invention. The stations 22 use an out-of-band channel (control channel) 16 and an in-band channel (data transmission) such as a 60 GHz channel as shown. In this example, Device A and Device B are involved in data communication, and Device C and Device D are involved in data communication. If data transmission from Device A to Device B does not interfere with data transmission from Device C to Device D, then Device A and Device B can simultaneously use the same in-band data channel as Device C and Device D.

Figure 3:
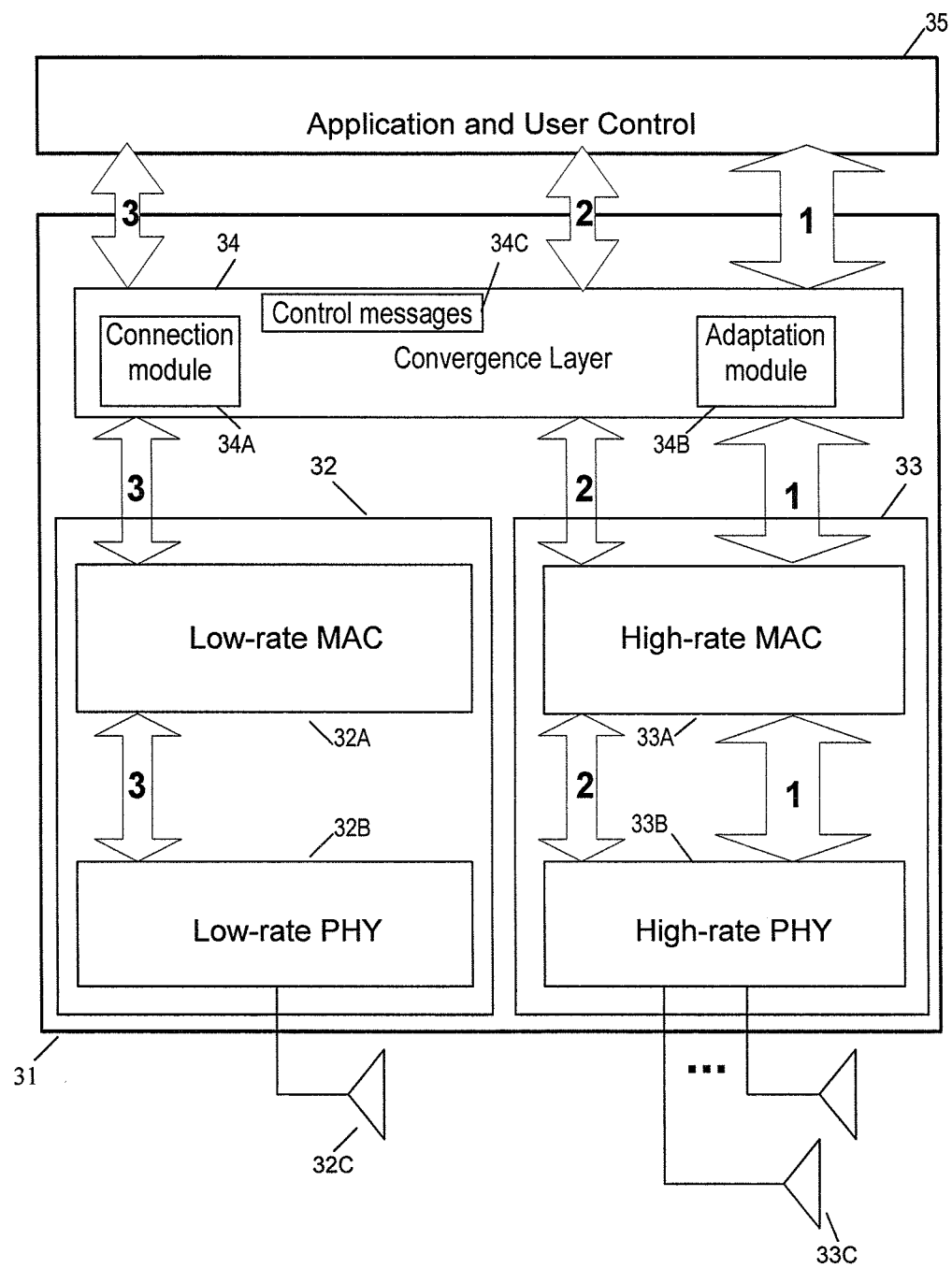
FIG. 3 shows an example protocol architecture for wireless communication by a wireless station in a wireless network, according to the present invention.

FIG. 3 shows an example block diagram of an architecture 30 for a wireless station 31 (e.g., a station 22 in FIG. 2 or a station 12 in FIG. 1). The station 31 includes an out-of-band communication module 32 (e.g., low-rate wireless transceiver) and an in-band communication module 33 (e.g., high-rate wireless transceiver). The communication module 32 (control communication module) is used for communication of control messages via an out-of-band channel 16. The communication module 33 (data communication module) is used for data communication via an in-band channel 18.

The station 31 can function as an initiator or a responder, wherein a transmission initiator is a station that first initiates transmission and can be a transmission sender or receiver. A transmission responder is a station that responds to the transmission initiator and can be a transmission sender or receiver. A frame structure is used for data transmission between wireless stations. The communication protocol can be an infrastructure mode or an ad-hoc mode communication protocol.

For example, frame aggregation can be used in a Media Access Control (MAC) layer and a PHY layer. The MAC layer obtains a MAC Service Data Unit (MSDU) and attaches a MAC header thereto, in order to construct a MAC Protocol Data Unit (MPDU), for transmission. The MAC header includes information such as a source address (SA) and a destination address (DA). The MPDU is a part of a PHY Service Data Unit (PSDU) and is transferred to a PHY layer in the transmitter to attach a PHY header (i.e., PHY preamble) thereto to construct a PHY Protocol Data Unit (PPDU). The PHY header includes parameters for determining a transmission scheme including a coding/modulation scheme. Before transmission as a packet from a transmitter to a receiver, a preamble is attached to the PPDU, wherein the preamble can include channel estimation and synchronization information.

The communication module 33 provides a MAC/PHY path for the data communication over an in-band channel, and the communication module 32 provides a MAC/PHY path for control message communication over an out-of-band channel. Specifically, the communication module 32 implements out-of-band communication for control transmission via an antenna 32C on an out-of-band channel. The communication module 32 implements an in-band communication for transmission of information (e.g., data, video, audio, etc.) via the antennas 33C on an in-band channel.

The out-of-band channel is used for device discovery and association between two stations, which allows selection of an in-band communication channel for information transmission between the two stations.

A convergence module 34 in the wireless station 31 implements a process using the communication module 32 for scanning an out-of-band channel 16 via the communication module 32 to discover another wireless station, communicating capability information with a discovered station to establish association, and communicating channel occupation information with the discovered station.

Thereafter, the convergence module 34 provides selection of an in-band communication channel 18 based on the occupation information for information communication with the discovered station via the communication module 33 on the in-band channel. The information communication may include ad-hoc mode communication over the in-band wireless channel.

As noted, the communication module 33 comprises a high-rate (HR) module including a HR MAC/PHY path for the in-band data channel 18 (e.g., a 60 GHz frequency band). Further, the communication module 32 comprises a low-rate module including a LR MAC/PHY path for the out-of-band channel 16 (e.g., Bluetooth, UWB or WLAN, or a different 60 GHz band as used in the HR path).

Specifically, the communication module 32 comprises a LR MAC layer 32A and a LR PHY layer 32B, and supports omni-directional wireless communication over the out-of-band channel 16. The communication module 33 comprises a HR MAC layer 33A and a HR PHY layer 33B, and supports directional (or beamformed/steered) wireless communication on the in-band channel 18.

The convergence module 34 interfaces an application/user control layer 35, and coordinates and synchronizes the communication modules 32 and 33 by messaging.

The convergence module 34 includes a connection module 34A that provides overlay connection control and management for various channels (e.g., both LR and HR channels), by communication of control/management information via the out-of-band control channel 16. In one example, the connection module 34A coordinates communications through a 60 GHZ frequency band via the communication module 33 and through a 2.4 GHz, 5 GHz or a different 60 GHz frequency band via the communication module 32.

The convergence module 34 further includes an adaptation module 34B that provides information adaptation for communication via the in-band channel 18. In one example, the adaptation module 34B provides video stream/data adaptation for communication via the in-band channel, wherein such adaptation includes pixel partitioning, aggregation/acknowledgment, fast format/link adaptation, transmission power control, etc.

As noted, the LR PHY/MAC layer implemented by the communication module 32 is mainly used for control message exchange between stations on the out-of-band channel 16. An example is when initially a first station 31 powers on or resumes operation the convergence layer 34 uses the communication module 32 to communicate control messages on the out-of-band channel to discover and associate with other stations. Upon successful discovery and association, an in-band channel is established by bandwidth reservation for communication (e.g., ad-hoc mode) on the selected in-band channel between the first station and another station via the HR PHY/MAC layer of the communication module 32. In addition, when the in-band channel is established, control message may be transmitted on the out-of-band channel for facilitating communication on the in-band channel by the two stations.

An example communication scenario is now described. FIG. 3 shows three logical communication paths in the station 31. A first path represents a high-rate data communication path 1 which can carry information (e.g., data, high-rate uncompressed video/audio, etc.). A second path represents a high-rate communication path 2 which can carry control messages after the in-band channel has been established between two wireless stations. A third path represents a low-rate communication path 3 which can carry control/management messages on the out-of-band channel, such as before the in-band channel is established between two stations.

Figure 4:
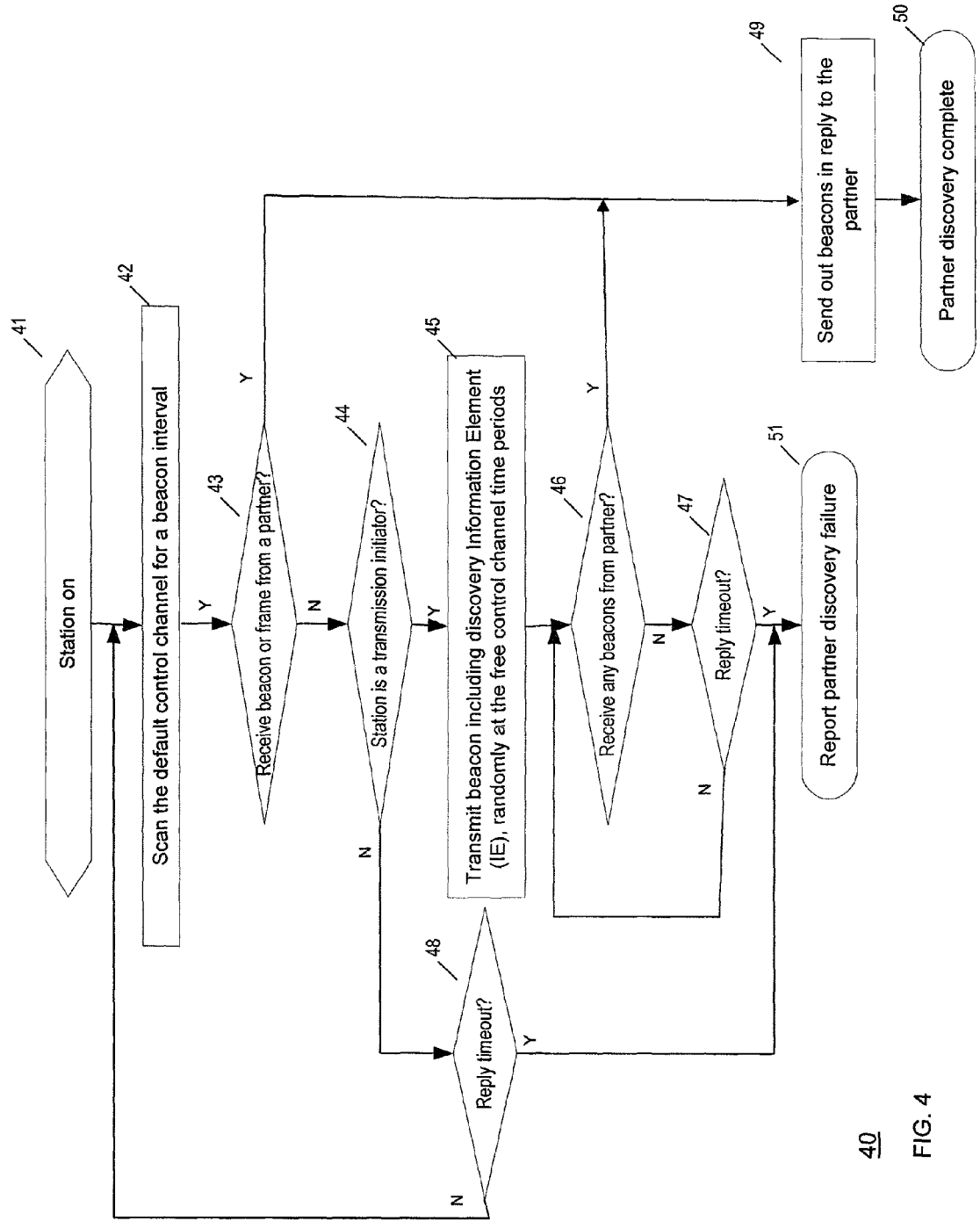
FIG. 4 shows an example flowchart of a device discovery process via an out-of-band channel for wireless communication, according to the present invention.

FIG. 4 shows a flowchart of the steps for an example device discovery process 40 on an out-of-band channel implemented by the architecture 30 in FIG. 3, according to the present invention. Every station transmits its own beacon on a control channel, and places therein the channel occupation information that the station is aware of. Referring to FIG. 4, a discovering wireless station (station) scans the default out-band-channel channel to discover a partner wireless station (partner), before selecting an in-band channel (e.g., selecting a 60 GHz channel) and reserving bandwidth for data communication therebetween on the in-band channel. The process 40 includes the following steps:

Step 41: A station powers on or resumes operation.
Step 42: The station scans the default out-of-band channel (control channel) during a mMaxBeaconIntervalTime period for a beacon frame from a partner.
Step 43: It is determined if the station received a beacon from the partner over the out-of-band channel. If yes, go to step 49, otherwise proceed to step 44.
Step 44: It is determined if the station is a transmission initiator. If yes, go to step 48, otherwise proceed to step 45.
Step 45: At free control channel time periods, the station randomly transmits its own beacon with a device discovery information element (IE) on the out-of-band channel.
Step 46: It is determined if the station received any beacons on the out-of-band channel from the partner. If yes, go to step 49, otherwise proceed to step 47.
Step 47: It is determined if a reply period timeout (e.g., mMaxReplyingBeaconTimeout) has occurred. If not, go back to step 46, otherwise proceed to step 51.
Step 48: It is determined if a reply period timeout (e.g., mMaxReplyingBeaconTimeout) has occurred. If yes, proceed to step 51, otherwise go back to step 42.
Step 49: The stations transmit beacon(s) on the out-of-band channel in reply to the partner.
Step 50: Completion of a successful partner discovery. Stop.
Step 51: Report the partner discovery failure, for this period, to the application/user. Stop.

In one example scenario according to the process 40 implemented by the connection module 34A of the convergence module 34A, a station 31 powers on or resumes from stand-by, and using its communication module 32 scans the default out-of-band channel for at least a beacon interval time period, to detect peak transmission energy from other stations, and analyze beacons and other frames from a (potential) partner it wishes to discover. If the station is the initiator for communication, but cannot receive any beacons from the partner, then the station sends out its own beacon with a device discovery IE on the out-of-band channel. If the station receives a reply beacon from the partner on the out-of-band channel, then the station and partner successfully discover each other.

However, if the station is a transmission responder, but cannot receive any frames from the partner, then the station keeps scanning the out-of-band channel for beacons from the partner (i.e., the transmission initiator). If the station receives a beacon sent from the partner, the station replies with a beacon as soon as possible over a free channel time block on the out-of-band channel (the station and partner successfully discover each other).

In the above discovery process, by only allowing the transmission initiator to send out beacons at the discovery stage, the probability of collision between the initiator and the responder may be reduced.

After discovery on the out-of-band channel is successfully completed, the station and the partner transmit control packets on the out-of-band channel for further device and service discovery, and exchange in-band channel capability using convergence layer control messages 34C implemented by the communication module 34A of the convergence module 34. The connection module 34A manages scheduling and synchronization, device and service discovery functions, association and authentication functions, and bandwidth reservation.

After a station discovers a partner, then during an association process the station and the partner exchange capability information via the convergence module, on an out-of-band channel (e.g., LR channel 16), for establishing an in-band data channel (e.g., HR channel 18). The control messages 34C via the convergence module carry the capability information between the station and the partner on the out-of-band channel. The station and partner set the capability information fields in the control messages 34C and exchange that information on the out-of-band channel. The control messages can be placed in convergence layer beacons or other control message formats, and transmitted by the communication module 32 of the involved stations on the out-of-band channel. The station and partner then check such capability information to determine if they can appropriately communicate over an in-band channel.

Such capability information includes device profiles defining the set of PHY (asymmetric or symmetric) capability, high-rate data capability, and other capabilities such as fixed or mobile, AC line or battery powered, Audio/Visual (AV) and/or data support, etc., for a station. Table 1 below shows an example station capability field exchanged during the association process:

TABLE 1

| Capability Field Bits: | | | |
| --- | --- | --- | --- |
| 1 | 1 | 1 | 2 |
| HR Transmit | HR Receive | Battery or line powered | Support AV or Data |

In one example, if a subfield in the capability field above is set, that indicates the station has the capability. A "Support AV or Data" subfield is shown in Table 2 below:

TABLE 2

| Audio/Visual (AV) or Data Subfield | |
| --- | --- |
| Value | Meaning |
| 00 | Support Data |
| 01 | Support AV |
| 10 | Support both Data and AV |
| 11 | Reserved |

The capability information is used by the stations to determine if they can associate for communication on an in-band channel.

After discovery and association, the discovering station and the partner station (e.g., the initiator and the responder), determine capabilities of one another. For example, a 60 GHz in-band channel can be selected for communication if both the station and the partner have the capability to communication over such as in-band channel (i.e., both the station and the partner include 60 GHz transceivers or are 60 GHz capable stations).

If both the station and the partner have such in-band communication capability, then they perform in-band communication channel selection (e.g., to determine which 60 GHz data channel to use) and bandwidth reservation, by signaling on the default out-of-band channel. In one example, after successful discovery and association, the initiator and responder select an in-band communication channel from m channels in the 60 GHz frequency band, and reserve bandwidth on the selected in-band channel for communication therebetween. For example, if each data channel is 2 GHz in-band, then m<4 in most regions of the world. An example in-band channel selection process is described below.

In ad-hoc mode, every station transmits its own beacon on a control channel, and places therein the channel occupation information that the station is aware of. For example, convergence layer beacons or other control message formats, carrying channel occupation information are transmitted via the convergence module of each station over an out-of-band channel. Such channel occupation information includes information indicating if an in-band channel is in use, and by which stations (e.g., in-band channel bandwidth reservation information, in-band channel time scheduling information, etc.).

The initiator and the responder analyze the beacons received on the same default out-of-band channel (e.g., an LR channel), to obtain channel occupation information for each in-band channel (HR channel, e.g., a 60 GHz wireless channel). The responder transmits an in-band channel occupation information notification frame to the initiator over the control channel, to report the in-band channel occupation information obtained from the received beacons. The initiator receives the in-band channel occupation information and combines the channel occupation information for itself and the responder, to select an in-band channel for communication.

Specifically, when an initiator and a responder need to communicate on an in-band channel, the initiator waits to receive in-band channel occupation information from the responder. Thereafter, the initiator combines the received channel occupation information with its own channel occupation information, which allows the initiator to determine which in-band channel has sufficient available bandwidth for communication between the initiator and the responder.

In one example, the initiator attempts to select a free 60 GHz in-band channel for transmission. If no free 60 GHz channel is available, the initiator and responder continue monitoring convergence layer beacons carrying channel occupation information, until such an in-band channel becomes available. The initiator and the responder then broadcast convergence layer ad-hoc mode beacons over the out-of-band channel via the convergence module, for bandwidth reservation and data communication over a selected in-band 60 GHz channel. Said ad-hoc beacons may include information similar to that in e.g., an IEEE 802.15.3 beacon or WiHD beacon, such as channel time scheduling information. As such, in this example the default out-of-band channel is to facilitate discovery, association and in-band channel selection for all 60 GHz capable stations.

Figure 5:
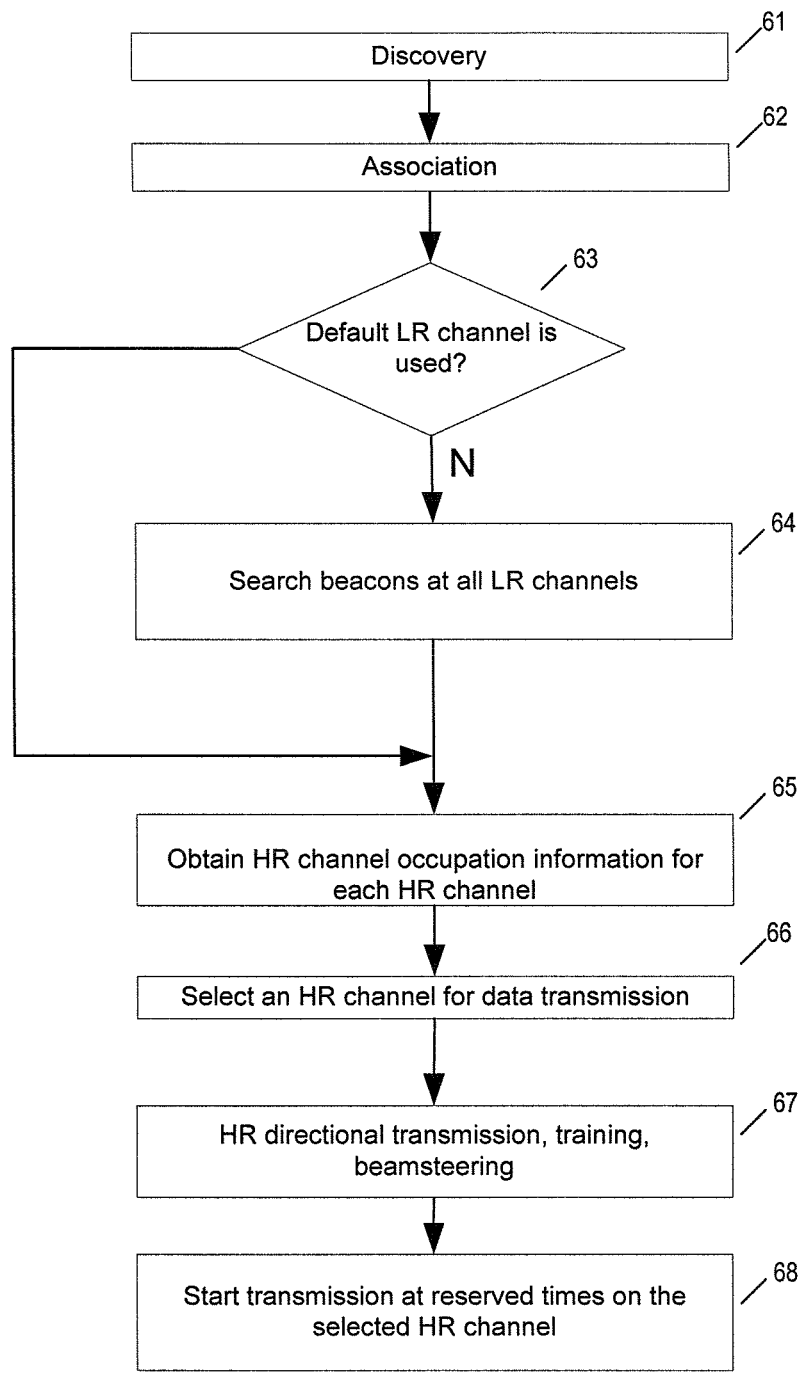
FIG. 5 shows an overall flowchart of an example process for using an out-of-band wireless channel to facilitate information communication on an in-band wireless channel between a pair of wireless stations, according to an embodiment of the present invention.

Referring to an example data channel selection process 60 in FIG. 5 for an initiator and responder, after successful station discovery (step 61) and association (step 62) between the initiator and responder as described above, it is determined if the out-of-band channel (e.g., LR channel 16) is used by the initiator and responder (step 63). If yes, then the in-band channel (e.g., HR channel 18) occupation information is obtained for each in-band channel from convergence layer beacons received on the default out-of-band channel (step 65). Using the in-band channel occupation information, an in-band channel is selected for data transmission between the initiator and the responder (step 66). Then, directional transmission including typical training or beamsteering is performed on the in-band (HR) channel between the initiator and the responder. Directional data transmission is then performed at reserved times on the selected in-band channel based on the training and beamsteering information (step 68).

In step 63, if the initiator and responder use different out-of-band control channels (such as when multiple LR control channels are available for use with HR stations (e.g., 60 GHz data channel capable devices)), then the initiator and responder search for convergence layer beacons at all such out-of-band channels (step 64), to collect in-band channel allocation information. After searching, if an in-band channel is available for both the initiator and responder, the initiator and responder can reserve the in-band channel using data channel bandwidth reservation signaling (e.g., control messages 34 on an out-of-band channels via the convergence module 34). After reserving the in-band channel, the initiator and responder broadcast convergence layer beacons over an out-of-band channel to facilitate communication on the in-band channel (such beacons include information similar to that in e.g., an IEEE 802.15.3 beacon or WiHD beacon, such as channel time scheduling information). For example, a broadcast convergence layer ad-hoc mode beacon can be similar to a typical beacon, exchanged via the convergence module 34 at each of the initiator and responder.

In one example operation of the station 31, initially the communication module 33 for in-band (HR) communication is off and the communication module 32 for out-of-band (LR) communication is on. The MAC LR of the communication module 32 attempts to associate/find other stations on the out-of-band channel, and exchanges capacity/capability information using the convergence module on the out-of-band channel, to determine if based on the exchanged information another station has in-band (HR) communication capability for association (e.g., not all stations/devices 12 in FIG. 1 are required to have both LR and HR communication capability (e.g., DevN−1), but all stations have LR communication capability). Upon successful discovery and association between two stations, then the convergence module in each station turns on the respecting communication module 33 therein for in-band channel communications.

As such, in FIG. 5, steps 61 (i.e., steps 42 and 45 in FIG. 4), 62 and 64 are performed using the out-of-band channel. Then, upon successful discovery, the connection module 34A in each station handles in-band communication and performs steps 65, 66, 67 and 68. The adaptation module 34B deals with data transmission rates based on in-band channel conditions.

If a reservation-based channel access scheme is used, then a station can determine out-of-band channel occupation by detecting whether a channel is available through reading beacons which provide channel reservation information. If a contention-based channel access scheme is used, a station can determine whether a channel is available by sensing the channel through energy detection. A similar approach is used for detecting in-band channel occupation.

When a fast connection is required by users and applications, a first wireless station can discover other wireless stations and determine in-band channel transmission parameters before a need for data transmission by the first station arises. This is different from the case when a first station needs to communicate with another station, and at that time begins discovery and negotiates HR transmission/receiving parameters.

In order to discover other wireless stations and determine in-band channel transmission parameters before a need for data transmission arises, the first station implements signaling on the out-of-band channel. Through such signaling, the first station discovers potential stations (partners) for communication and determines in-band channel transmission configuration parameters. This may include determining a need for bandwidth reservation for communication over the in-band channel in addition to determining in-band channel transmission parameters. Further, the first station retains the setting parameters after a transmission completes, for re-establishing an HR link later. Such an HR link re-establishing process may allow a station and a partner to quickly re-establish in-band channel connections based on information from a previous in-band link between them.

An example application involves a case where multiple source stations can transmit streams to one sink station, at different times. For instance, in a conference room, multiple laptop computers can wirelessly transmit data streams to a projector device over an in-band channel in a round-robin fashion, at different times. Another example involves multiple devices in a living room, such as a set top box and a DVD player, which wirelessly transmits data/video streams to a TV over the data channel, at different times.

As is known to those skilled in the art, the aforementioned example architectures described above, according to the present invention, can be implemented in many ways, such as program instructions for execution by a processor, as logic circuits, as an application specific integrated circuit, as firmware, etc. For example, the convergence module 34 can be implemented as a software or firmware application, a computer-implemented method, a program product stored on a computer useable medium, for execution on a processor (e.g., CPU, microcontroller) in a wireless station. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of wireless communication, comprising:
scanning an out-of-band wireless channel to discover a wireless station;
exchanging device profiles comprising a set of device capability information between a discovery station and a discovered partner station over the out-of-band channel to establish association, wherein the capability information comprises one or more of station transmit and receive rate capability information, physical (PHY) layer capability information and station mobility capability information comprising a fixed station and mobile station capability, wherein the discovery station and the discovered partner station use the capability information of one another for determining whether to associate for communication with one another over an in-band wireless channel;

communicating channel occupation information with the discovered partner station; and
selecting an in-band wireless channel based on the occupation information for information communication with the discovered partner station.

2. The method of claim 1, wherein scanning an out-of-band channel includes detecting beacons from a wireless station.

3. The method of claim 1 wherein the capability information further comprises power source capability information.

4. The method of claim 3, wherein the power source capability information comprises a battery and alternating current (AC) line capability bit field.

5. The method of claim 1, wherein communicating channel occupation information includes communicating channel occupation information with the discovered partner station over the out-of-band channel.

6. The method of claim 1, wherein the channel occupation information includes channel bandwidth availability information.

7. The method of claim 6, wherein selecting an in-band channel includes selecting an in-band channel based on the channel bandwidth information, wherein the channel bandwidth information comprises reservation and scheduling information.

8. The method of claim 1, wherein selecting an in-band channel includes selecting an in-band communication channel based on the occupation information for ad-hoc mode information communication with the discovered partner station, wherein for ad-hoc mode, stations coordinate with each other within a transmission range of one another.

9. The method of claim 8, wherein selecting an in-band channel includes selecting a 60 GHz frequency band communication channel based on the occupation information for ad-hoc mode information communication with the partner discovered station.

10. The method of claim 8, wherein ad-hoc mode further comprises each station transmitting its own beacon on a control channel and placing therin channel occupation information.

11. The method of claim 1, further including communicating data with the discovered partner station over the in-band channel, while using the out-of-band channel to exchange of control messages, wherein the in-band channel and the out-of band channel are at different wireless frequencies.

12. The method of claim 11 further including performing directional data communication over the in-band channel and performing omni-directional control message signaling communication over the out-of-band channel.

13. The method of claim 1, wherein the out-of band channel is at a lower frequency band than the in-band channel.

14. The method of claim 1, wherein the out-of-band channel is at a same frequency band as the in-band channel, but at a different frequency.

15. The method of claim 1 further including communicating beacons on the out-of-band channel, wherein the beacons can be transmitted anywhere in a superframe period.

16. The method of claim 1, wherein the occupation information comprises duration of a reserved channel time block.

17. The method of claim 1, wherein scanning the out-of-band wireless channel to discover the wireless station comprises discovering the wireless station for a partner before selecting the in-band wireless channel and reserving bandwidth for data communication on the in-band channel.

18. The method of claim 17, wherein scanning the out-band wireless channel further comprises scanning at least a beacon interval time period for detecting peak transmission energy from other stations, and analyzing beacons and other frames from other stations.

19. The method of claim 1, wherein discovery of the wireless station communicating of in-band channel transmission parameters occurs before a need for data transmission by a discovering station arises.

20. The method of claim 1, wherein an initiator station waits to receive in-band channel occupation information from a responder station, thereafter, the initiator station combines received channel occupation information with its own channel occupation information for determining an in-band channel with sufficient available bandwidth for communication between the initiator station and the responder station.

21. The method of claim 1, further comprising determining whether stations can establish association based on the capability information communicated by a discovery station and a partner station.

22. The method of claim 1, wherein the capability information further comprises audio/visual and data support capability information.

23. The method of claim 1, wherein the PHY layer capability information further comprises an asymmetric and symmetric capability bit field.

24. The method of claim 1, further comprising:
determining by the discovery station and the partner station to associate based on exchanging of the profiles.

25. The method of claim 24, wherein the discovery station and the partner station each determine capability information of one another.

26. The method of claim 25, wherein the capability information is indicated in a bit field that comprises one or more sub-bit fields for indicating station transmit and receive rate capability information, physical (PHY) layer capability information, station mobility capability information comprising fixed station and mobile station capability, and audio support, video support, and data support capability.

27. The method of claim 1, wherein after discovery on the out-of-band channel, the discovery station and the discovered partner station transmit control packets in the out-of-band channel for device and service discovery.

28. The method of claim 27, wherein after discovery on the out-of-band channel, the discovery station and the discovered partner station exchange in-band channel capability information using convergence layer control messages.

29. A wireless communication station, comprising:
a processor coupled with:
an out-of-band communication module configured for scanning an out-of-band communication channel to discover a wireless partner station and communicating control information over the out-of-band channel, and exchanging device profiles between the wireless communication station and the wireless partner station, the profiles each comprising a set of device capability information over the out-of-band channel for establishing association between the wireless communication station and the wireless partner station, wherein the capability information comprises station transmit and receive rate capability information and station mobility capability information comprising a fixed station and mobile station capability bit field;
an in-band communication module configured for information communication over an in-band communication channel; and
a convergence module configured for communicating channel occupation information with the wireless partner station to select an in-band for in-band communication with the wireless partner station via the in-band communication module, wherein the wireless communication station and the wireless partner station use the capability information of one another for determining whether to associate for communication with one another over a selected in-band wireless channel.

30. The wireless station of claim 29, wherein the convergence module is further configured for scanning an out-of-band control channel using the out-of-band communication module by detecting beacons from a wireless station.

31. The wireless station of claim 29, wherein the capability information further comprises station high rate channel transmit and receive communication capability information.

32. The wireless station of claim 29, wherein the out-of-band convergence module is further configured for communicating channel occupation information with the wireless partner station over the out-of-band channel.

33. The wireless station of claim 29, wherein the channel occupation information includes channel bandwidth reservation and scheduling information.

34. The wireless station of claim 33, wherein the convergence module is further configured for selecting an in-band channel based on the channel bandwidth information.

35. The wireless station of claim 29, wherein the convergence module is further configured for selecting an in-band channel based on the occupation information for ad-hoc mode in-band communication with the wireless partner station.

36. The wireless station of claim 29 wherein the convergence module is further configured for selecting a 60 GHz frequency in-band communication channel based on the occupation information for information communication with the wireless partner station.

37. The wireless station of claim 29, wherein the out-of-band communication module is further configured for performing omni-directional communication over the out-of-band channel.

38. The wireless station of claim 29, wherein the in-band communication module is further configured for performing directional data communication over the in-band channel.

39. The wireless station of claim 29, wherein the out-of-band channel is at a lower frequency band than the in-band channel.

40. The wireless station of claim 29, wherein the out-of-band channel is at a same frequency band as the in-band channel.

41. The wireless station of claim 29, wherein the out-of-band communication module is further configured for communicating beacons on the out-of-band channel, wherein the beacons can be transmitted anywhere in a superframe period.

42. A program product stored on a computer useable non-transitory medium for wireless communication, the program product comprising program code for causing a processor of a wireless station to perform:
    scanning an out-of-band wireless channel to discover a partner wireless station;
    communicating channel occupation information and exchanging device profiles comprising a set of station capability information between the wireless station and the partner station, wherein the station capability information comprises station transmit and receive rate capability information and station mobility capability information comprising a fixed station and mobile station capability bit field; and
    selecting an in-band wireless channel based on the occupation information for information communication with the partner station,
    wherein the wireless station and the partner station use the capability information of one another for determining whether to associate for communication with one another over a selected in-band wireless channel.

43. The program product of claim 42 further comprising program code for causing a processor of the wireless station to exchange capability information with the partner station to establish association.

44. A wireless communication system, comprising:
    an electronic wireless discovering station and a wireless partner station;
    the discovering station comprising:
        an out-of-band communication module configured for scanning an out-of-band communication channel to discover a partner station and communicating control information over the out-of-band channel, and for exchanging device profiles comprising a set of device capability information between the discovering station and the partner station over the out-of-band channel for establishing association with the partner station, wherein the capability information comprises one or more of station transmit and receive rate capability information, physical (PHY) layer capability information and station mobility capability information comprising fixed station and mobile station capability bit field;
        an in-band communication module configured for information communication over an in-band communication channel; and
        a convergence module configured for communicating channel occupation information with the partner station to select an in-band channel for in-band communication with the partner station via the in-band communication module,
    wherein the discovering station and the partner station use the capability information of one another for determining whether to associate for communication with one another over a selected in-band wireless channel.

45. The system of claim 44, wherein the convergence module is further configured for scanning an out-of-band control channel using the out-of-band communication module by detecting beacons from a wireless station to discover the partner station.

46. The system of claim 44, wherein the capability information further comprises station high rate channel communication capability information.

47. The system of claim 44, wherein the out-of-band convergence module is further configured for communicating channel occupation information with the partner station over the out-of-band channel.

48. The system of claim 44, wherein the channel occupation information includes channel bandwidth availability information.

49. The system of claim 48, wherein the convergence module is further configured for selecting an in-band channel based on the channel bandwidth information.

50. The system of claim 44, wherein the convergence module is further configured for selecting an in-band channel based on the occupation information for ad-hoc mode in-band communication with the partner station.

51. The system of claim 44, wherein the convergence module is further configured for selecting a 60 GHz frequency in-band communication channel based on the occupation information for information communication with the partner station.

52. The system of claim 44, wherein the out-of-band communication module is further configured for performing omni-directional communication over the out-of-band channel.

53. The system of claim 44, wherein the in-band communication module is further configured for performing directional data communication over the in-band channel.

54. The system of claim 44, wherein the out-of-band channel is at a lower frequency band than the in-band channel.

55. The system of claim 44, wherein the out-of-band channel is at a same frequency band as the in-band channel.

56. The system of claim 44, wherein the out-of-band communication module is further configured for communicating beacons on the out-of-band channel, wherein the beacons can be transmitted anywhere in a superframe period.

* * * * *